US012230426B2

(12) United States Patent
Hwang et al.

(10) Patent No.: US 12,230,426 B2
(45) Date of Patent: Feb. 18, 2025

(54) SOFT MAGNETIC POWDER COMPOSITION FOR INDUCTOR CORE AND METHOD OF MANUFACTURING INDUCTOR CORE USING THE COMPOSITION

(71) Applicants: HYUNDAI MOBIS CO., LTD., Seoul (KR); ELECTRO M CO., LTD., Ansan-si (KR)

(72) Inventors: Deuk Kyu Hwang, Yongin-si (KR); Hee Hyuk Lee, Yongin-si (KR); Kee Yang Lee, Yongin-si (KR); Suk Yi Kang, Seoul (KR); Tae Hyun Kim, Ansan-si (KR)

(73) Assignees: HYUNDAI MOBIS CO., LTD., Seoul (KR); ELECTRO M CO., LTD., Ansan-si (KR)

( * ) Notice: Subject to any disclaimer, the term of this patent is extended or adjusted under 35 U.S.C. 154(b) by 0 days.

(21) Appl. No.: 18/081,094

(22) Filed: Dec. 14, 2022

(65) Prior Publication Data

US 2023/0368951 A1 Nov. 16, 2023

(30) Foreign Application Priority Data

May 16, 2022 (KR) ........................ 10-2022-0059425

(51) Int. Cl.

| | |
|---|---|
| ***H01F 1/147*** | (2006.01) |
| ***B22F 1/00*** | (2022.01) |
| ***B22F 1/052*** | (2022.01) |
| ***B22F 1/142*** | (2022.01) |
| ***B22F 1/16*** | (2022.01) |
| ***B22F 3/02*** | (2006.01) |
| ***B22F 3/24*** | (2006.01) |
| ***B22F 9/08*** | (2006.01) |

(Continued)

(52) U.S. Cl.
CPC .......... *H01F 1/14733* (2013.01); *B22F 1/052* (2022.01); *B22F 1/09* (2022.01); *B22F 1/142* (2022.01); *B22F 1/16* (2022.01); *B22F 3/02* (2013.01); *B22F 2003/248* (2013.01); *B22F 2009/0824* (2013.01); *B22F 2301/35* (2013.01); *B22F 2302/253* (2013.01); *B22F 2302/256* (2013.01); *B22F 2304/10* (2013.01); *B22F 2998/10* (2013.01); *H01F 27/255* (2013.01); *H01F 41/0246* (2013.01)

(58) Field of Classification Search
CPC .. H01F 1/147; H01F 1/14708; H01F 1/14716; H01F 1/14725; H01F 1/14733; H01F 1/14741; H01F 1/1475; H01F 1/14758; H01F 1/14766; H01F 1/14775; H01F 1/14783; H01F 1/14791; H01F 27/255; H01F 41/0246
See application file for complete search history.

(56) References Cited

FOREIGN PATENT DOCUMENTS

| | | | |
|---|---|---|---|
| CN | 112635147 A * | 4/2021 | ......... H01F 1/14791 |
| JP | 2003-234594 A | 8/2003 | |
| JP | 2003347113 A * | 12/2003 | |

(Continued)

*Primary Examiner* — Ricardo D Morales
(74) *Attorney, Agent, or Firm* — MORGAN, LEWIS & BOCKIUS LLP

(57) ABSTRACT

A soft magnetic powder composition for an inductor core comprises 60 to 80 wt % Fe—Ni alloy powder, 5 to 25 wt % Fe—Si alloy powder, and 10 to 30 wt % Fe—Si—Al alloy powder based on a total alloy powder and a method of manufacturing the inductor uses the soft magnetic powder composition.

8 Claims, 2 Drawing Sheets

(51) Int. Cl.
*H01F 27/255* (2006.01)
*H01F 41/02* (2006.01)

(56) References Cited

FOREIGN PATENT DOCUMENTS

| | | | | |
|---|---|---|---|---|
| JP | 2008-187119 | A | | 8/2008 |
| JP | 2013098384 | A | * | 5/2013 |
| KR | 10-0545849 | B1 | | 1/2006 |
| KR | 10-0960699 | B1 | | 5/2010 |
| KR | 10-1882444 | B1 | | 7/2018 |

* cited by examiner

[FIG. 1]
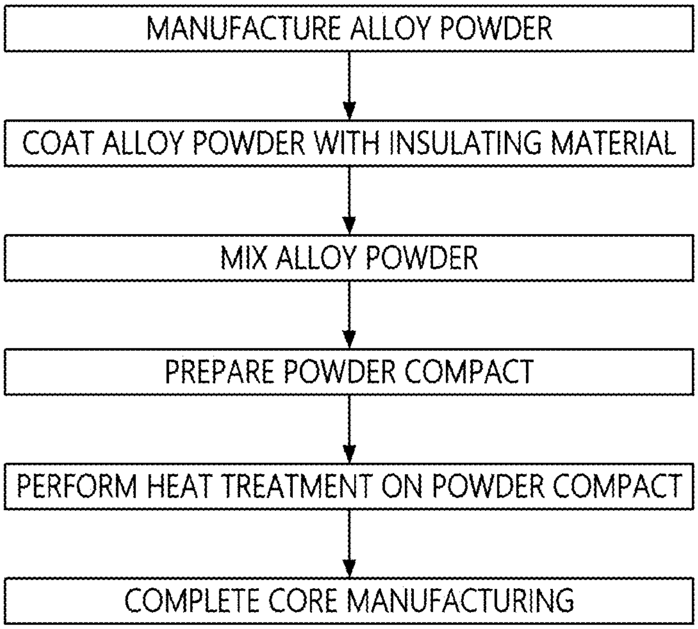
[FIG. 2]
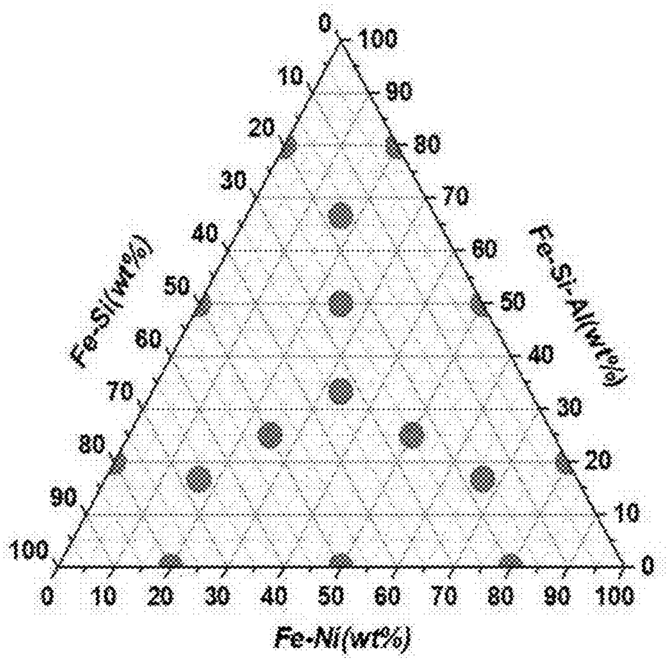

[FIG. 3]
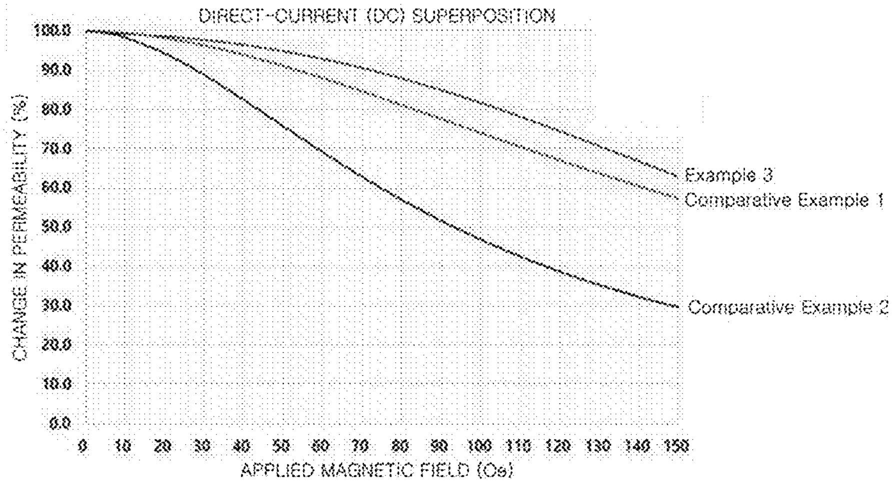

SOFT MAGNETIC POWDER COMPOSITION FOR INDUCTOR CORE AND METHOD OF MANUFACTURING INDUCTOR CORE USING THE COMPOSITION

CROSS-REFERENCE TO RELATED APPLICATION

This application claims priority to and the benefit of Korean Patent Application No. 2022-0059425, filed on May 16, 2022, the disclosure of which is incorporated herein by reference in its entirety.

BACKGROUND

1. Field of the Invention

The present invention relates to a soft magnetic powder composition for an inductor core and a method of manufacturing an inductor core using the same, which are capable of providing an inductor core having an excellent magnetic permeability, excellent direct-current (DC) superposition characteristics, and an improved core loss characteristic by mixing a metal alloy powder of Fe, Ni, Al, and Si at a predetermined ratio.

2. Discussion of Related Art

In the development of eco-friendly vehicles, the importance of the characteristics of an inductor core for power conversion is increasing. An inductor included in a power factor correction (PFC) circuit of an on-board charger (OBC), which is a key component of power conversion in a vehicle, includes a housing, a coil, and a soft magnetic core, and the soft magnetic core serves to focus a magnetic line of force generated by a Cu coil and serves as a channel. Magnetic characteristics, such as direct-current (DC) superposition and core loss of an inductor core made of a soft magnetic powder, have great effects on performance of a power conversion component of a vehicle so that it is necessary to manufacture the inductor core to meet certain specifications.

A product formed by compressing and molding a Fe—Si-based or Fe—Si—Al-based metal powder is mainly used as the conventional inductor core, but this product has poor magnetic characteristics such as core loss or DC superposition so that it is difficult to apply the product as a power conversion component of a vehicle. In addition, in the case of the Fe—Ni-based metal powder core, the competitiveness in price is low due to a high nickel content. In particular, the recent surge in the price of nickel is a significant obstacle to its use as an industrial material.

Therefore, it is required to develop a soft magnetic inductor core having excellent magnetic characteristics such as a DC superposition characteristic and a core loss characteristic and having excellent competitiveness in price and process suitability of materials.

SUMMARY OF THE INVENTION

The present invention is directed to providing a soft magnetic powder composition having an excellent core loss characteristic and a direct-current (DC) superposition characteristic and a method of manufacturing an inductor core for a power conversion component of a vehicle using the same.

According to an aspect of the present invention, there is provided a soft magnetic powder composition for an inductor core, which includes 60 to 80 wt % Fe—Ni alloy powder, 5 to 25 wt % Fe—Si alloy powder, and 10 to 30 wt % Fe—Si—Al alloy powder based on a total alloy powder.

According to another aspect of the present invention, there is provided a method of manufacturing an inductor core, which includes performing heat treatment on the Fe—Ni alloy powder, the Fe—Si alloy powder, and the Fe—Si—Al alloy powder at a high temperature, coating each of the high-temperature heat-treated soft magnetic alloy powders with an insulating material, mixing the soft magnetic alloy powders coated with the insulating material, applying a pressure to the soft magnetic alloy powders to prepare a powder compact, and performing heat treatment on the powder compact.

According to still another aspect of the present invention, there is provided an inductor for a power conversion component of a vehicle, which includes the core manufactured using the soft magnetic powder composition.

BRIEF DESCRIPTION OF THE DRAWINGS

The above and other objects, features and advantages of the present invention will become more apparent to those skilled in the art by describing exemplary embodiments thereof in detail with reference to the accompanying drawings, in which:

FIG. 1 is a process flowchart illustrating a process of manufacturing an inductor core using a soft magnetic powder composition according to one embodiment;

FIG. 2 is a graph illustrating a mixing ratio of an alloy powder according to one embodiment; and FIG. 3 is a graph illustrating measurement results of direct-current (DC) superposition characteristics of inductor cores according to Examples and Comparative Examples.

DETAILED DESCRIPTION OF EXEMPLARY EMBODIMENTS

Hereinafter, the present invention will be described in detail with reference to examples and the accompanying drawings. The following examples are merely illustrative to aid understanding of the present invention, and the scope of the present invention is not limited by the following examples. It should be understood that the present invention includes various modifications and can be embodied in many different forms, and includes all modifications, equivalents and substitutes included in the spirit and scope of the present invention.

The terms used herein are employed to describe only specific embodiments and are not intended to limit the present invention. Unless the context clearly indicates otherwise, the singular form includes the plural form. It should be understood that the terms “comprise,” “include,” and “have” specify the presence of stated herein features, numbers, steps, operations, components, elements, or combinations thereof but do not preclude the presence or possibility of adding one or more other features, numbers, steps, operations, components, elements, or combinations thereof.

Unless otherwise defined, all terms including technical or scientific terms used herein have the same meaning as the one commonly understood by those skilled in the art to which the present disclosure pertains. General terms that are defined in a dictionary should be construed as having meanings that are consistent in the context of the relevant art and are not to be interpreted as having an idealistic or excessively formalistic meaning unless clearly defined in the present application.

An inductor core having a magnetic characteristic that is applicable to a power conversion component (an on-board charger (OBC)) of an electric vehicle is provided using a powder-type soft magnetic metal material.

The soft magnetic powder composition according to one embodiment includes an Fe—Ni alloy powder, an Fe—Si alloy powder, and an Fe—Si—Al alloy powder, that is, three types of alloy powders, at a predetermined ratio.

In addition, a method of manufacturing an inductor core according to one embodiment includes performing heat treatment on the Fe—Ni alloy powder, the Fe—Si alloy powder, and the Fe—Si—Al alloy powder at a high temperature, coating each of the high-temperature heat-treated soft magnetic alloy powders with an insulating material; mixing the soft magnetic alloy powders coated with the insulating material, applying a pressure to the soft magnetic alloy powders to prepare a powder compact; and performing heat treatment on the powder compact.

In this way, in order to manufacture the inductor core using the soft magnetic powder composition, each alloy powder should be prepared first. Each alloy powder may employ a commercial alloy powder or may be directly prepared and used.

The method of manufacturing the Fe—Ni alloy powder, the Fe—Si alloy powder, and the Fe—Si—Al alloy powder, which are used in a powder composition for an inductor core using metal raw materials (Fe, Si, Al, and Ni), may employ, for example, a gas atomizer method. The gas atomizer method is a method of measuring raw materials (Fe, Si, Al, and Ni) according to a composition of each alloy, charging the measured raw materials into a melting furnace to manufacture a molten metal of a liquid metal at a temperature of 1,600° C. or higher using electromagnetic induction, passing the molten metal into a fine nozzle (having a diameter ranging from 1 mm to 8 mm), injecting an inert gas (nitrogen or argon) to the molten metal through the fine nozzle at a predetermined pressure (ranging from 10 MPa to 20 Mpa), and applying an impact to the molten metal to prepare a powder. A manufacturing condition may be varied according to a characteristic of each powder material, but the basic manufacturing process is similar.

Generally, a shape of the powder manufactured by the gas atomizer method is a spherical shape, and a size of a powder particle is variously manufactured. Therefore, powders of various sizes obtained by the gas atomizer method are used after being separated by size according to the purpose. Powder separation may be performed by a dry sieving method, and the powder size may be divided to be 20 μm or less, 20 μm to 45 μm, 45 μm to 63 μm, and 63 μm or more.

An average particle size of the Fe—Ni alloy powder suitable for manufacturing the inductor core according to the embodiment may be in the range of 17 μm to 23 μm, an average particle size of the Fe—Si alloy powder may be in the range of 23 μm to 29 μm, and an average particle size of the Fe—Si—Al alloy powder may be in the range of 20 μm to 28 μm. When the particle size is less than the above range, it takes a long time and high cost to manufacture or classify (sieve) the powder, and there is a possibility in that mold damage or a defect rate of a powder compact may be increased, and when the particle size exceeds the above range, since an insulating rate range of the insulating material added during the powder insulating coating is varied, it may be difficult to obtain a magnetic permeability and an excellent core loss characteristic. Therefore, when the particle size is optimized within the above ranges, there is an advantage of controlling the insulation coating process.

In addition, according to the embodiment, for use in the manufacturing of the inductor core, each alloy powder is heat-treated at a predetermined temperature and an atmospheric condition. The heat treatment of the alloy powder is performed by controlling the temperature and the reducing atmosphere to be able to remove internal stress of the powder and prevent oxidation. Since a specific heat treatment condition differs according to the composition and characteristic of each alloy powder, appropriate control is required according to the material and use.

The heat treatment temperature of each alloy powder may be controlled according to the characteristic of each powder in the range of 700° C. to 950° C. For example, the Fe—Si alloy powder may be heat-treated at a temperature ranging from 850° C. to 950° C. in a nitrogen atmosphere, and the Fe—Si—Al alloy powder may be heat-treated at a temperature ranging from 800° C. to 900° C. in a nitrogen atmosphere.

In addition, the heat treatment process may be performed two or more times in different temperature ranges, as necessary. For example, a primary heat treatment process may be performed on the Fe—Ni alloy powder at a temperature ranging from 750° C. to 800° C. in a hydrogen atmosphere, and a secondary heat treatment process may be performed on the Fe—Ni alloy powder at a temperature ranging from 600° C. to 800° C.

When the heat treatment process of each alloy powder is completed, the process of applying an insulating material on a surface of each alloy powder is performed. In the present invention, each of the Fe—Ni alloy powder, the Fe—Si alloy powder, and the Fe—Si—Al alloy powder is coated with a ceramic insulating material for the manufacturing of the inductor core.

In this case, one or more from the group consisting of silicate, glass frit, alumina, and water glass, may be selected as an available ceramic insulating materials. Among the above materials, silicate or water glass has an advantage of being inexpensive and convenient to use, but the present invention is not particularly limited thereto.

In each alloy powder coated with the insulating material, a content of the insulating material of the Fe—Ni alloy powder may be in the range of 1.5 to 3.0 wt %, a content of the insulating material of the Fe—Si alloy powder may be in the range of 3.0 to 4.2 wt %, and a content of the insulating material of the Fe—Si—Al alloy powder may be in the range of 1.0 to 2.5 wt %, the content of the insulating material may be controlled according to a magnetic permeability of the alloy powder, and the present invention is not particularly limited to the above ranges.

According to the embodiment, a permeability of each alloy powder coated with the insulating material may be in the range of about 50 to 125 and preferably in the range of 50 to 70. For example, an insulating coating of each alloy powder may be performed according to a magnetic permeability of 60 suitable for use in the inductor core, but the present invention is not particularly limited thereto, and when a content of the insulating material is controlled, the magnetic permeability may possibly be as great as 125.

As described above, when each of the alloy powders coated with the insulating material and having a magnetic permeability of 60 is obtained, these powders are mixed and used to manufacture the inductor core. A mixing ratio of the alloy powders coated with the insulating materials may be controlled according to a condition of implementing a direct-current (DC) superposition characteristic and a core loss characteristic. An example of the mixing ratio of the alloy powders is shown in a composition graph of FIG. 2. As shown in FIG. 2, in the present invention, by mixing and applying the alloy powders according to a condition of implementing a magnetic permeability and a specialized characteristic, it is possible to manufacture a powder core having a new characteristic by maximizing unique properties of individual alloy powders.

In the present embodiment, the alloy powders are mixed at various compositions to manufacture a soft magnetic core, a DC superposition characteristic and a core loss characteristic are measured, and a mixing ratio of the soft magnetic powder composition suitable for use in an electric power conversion component of a vehicle is confirmed. According to the above mixing ratio, the soft magnetic powder composition for the inductor core may include 60 to 80 wt % Fe—Ni alloy powder, 5 to 25 wt % Fe—Si alloy powder, and 10 to 30 wt % Fe—Si—Al alloy powder based on a total alloy powder. When the mixing ratio of the Fe—Si alloy powder and the Fe—Si—Al alloy powder exceeds the above ranges, the magnetic characteristic is degraded and thus core performance is degraded, and when the content of the Fe—Ni alloy powder is increased, the price is increase so that it is difficult to secure market competitiveness.

Therefore, the mixing ratio of the alloy powders is suitable for application to the inductor core, and the mixing ratio of the powder mixture composition and the content of the insulating material may be controlled according to a characteristic of a target product (core loss, a DC superposition characteristic, and a magnetic permeability).

In the embodiment, according to the mixing ratio of each alloy powder, in a metal content of the soft magnetic powder composition, Fe ranges from 54.2 to 68.8 wt %, Ni ranges from 30.0 to 40.0 wt %, Si ranges from 0.9 to 4.1 wt %, and Al ranges from 0.3 to 1.7 wt % based on the total alloy powder.

In addition, in the case of the soft magnetic alloy powder used in the present embodiment, a Ni content of the Fe—Ni alloy powder ranges from 40 to 50 wt %, a Si content of the Fe—Si alloy powder ranges from 3 to 6 wt %, a Si content of the Fe—Si—Al alloy powder ranges from 8 to 11 wt %, and an Al content of the Fe—Si—Al alloy powder ranges from 4 to 7 wt %.

Next, the Fe—Ni alloy powder, the Fe—Si alloy powder, and the Fe—Si—Al alloy powder are mixed as described above, and then a pressure is applied to the mixture to manufacture a powder compact. In addition, a lubricant may be mixed into the mixed alloy powder to manufacture the powder compact through a molding press, as necessary.

The pressure applied to the powder compaction may be in the range of 17 to 22 ton/cm$^2$. When the pressure is less than 17 ton/cm$^2$, it is difficult to implement the shape of the powder compact, a magnetic permeability of 60, and a DC superposition characteristic, and when the pressure exceeds 22 ton/cm$^2$, there are problems of damage to the compaction, shortening of a lifetime, scratches on an exterior of the molded product, degradation of a loss characteristic due to breakage of a powder insulating layer, and degradation of molding productivity.

When the powder compact is manufactured in the above-described pressure condition, heat treatment is performed to implement internal stress, a desired magnetic permeability, and a magnetic characteristic. The heat treatment process of the powder compact may be performed at a temperature in the range of 700° C. to 850° C. in a nitrogen or hydrogen atmosphere. Meanwhile, after the heat treatment process, it is also possible to impart corrosion resistance and strength to the powder compact through a post-treatment process such as epoxy coating treatment, as necessary.

The inductor core manufactured by mixing the three types of alloy powders according to the present invention has excellent magnetic characteristics such as the DC superposition characteristic and the core loss characteristic and has excellent competitiveness in price due to a low content of expensive nickel, thereby being suitable for use in an inductor of a power factor correction (PFC) circuit in an on-board charger (OBC) of eco-friendly vehicle.

Hereinafter, the present invention will be described in more detail through specific examples. However, the following examples are merely illustrative to aid understanding of the present invention, and the scope of the present invention is not limited by the following examples.

Example

1) Manufacturing of Alloy Powder

The Fe—Ni alloy powder, the Fe—Si alloy powder, and the Fe—Si—Ni alloy powder, which are to be used for manufacturing a soft magnetic powder core, were manufactured by a gas atomizer method. Powders were manufactured such that raw materials (Fe, Si, Al, and Ni) were measured according to a composition of each alloy, the measured raw materials were charged into a melting furnace to manufacture a molten metal of a liquid metal at a temperature of 1,600° C. or higher using electromagnetic induction, the molten metal passed into a fine nozzle (having a diameter ranging from 1 mm to 5 mm), an inert gas (nitrogen or argon) was injected to the molten metal through the fine nozzle at a predetermined pressure (ranging from 10 MPa to 20 Mpa), and an impact was applied to the molten metal.

The spherical powders of various sizes manufactured by the gas atomizer method were classified by a dry sieving method. A heat treatment process was performed after selecting the powders classified by a particle size according to conditions in the following Table 1.

TABLE 1

| Process conditions | | Fe - 50 wt % NI | Fe - 4.3 wt % Si | Fe - 9.5 wt % Si - 5.5 wt % Al |
|---|---|---|---|---|
| Powder manufacturing method | | Gas Atomizer | Gas Atomizer | Gas Atomizer |
| Average particle size (μm) | | 20 | 27 | 24 |
| Primary powder heat treatment | Temperature (° C.) | 750 | 950 | 900 |
| Primary powder heat treatment | Atmosphere | Hydrogen | Nitrogen | Nitrogen |
| Secondary powder heat treatment | Temperature (° C.) | 800 | — | — |
| Secondary powder heat treatment | Atmosphere | Nitrogen | — | — |

2) Insulation coating of alloy powder

Insulation coating treatment was performed on surfaces of the Fe—Ni alloy powder, the Fe—Si alloy powder, and the Fe—Si—Ni alloy powder. The insulation coating for the powder surface may be carried out in a dry type coating or a wet type coating, and a ribbon mixer was used in the present embodiment. The insulation coating was performed such that a ceramic-based silicate insulating material was used as the ribbon mixer, and the an amount of insulation was varied to allow each alloy powder to have a magnetic permeability of 60. A content of the insulating material is not fixed and varied according to a permeability condition. In the present embodiment, a content of the insulating material for each alloy powder was mixed with the Fe—Ni alloy powder in the range of 1.5 to 3.0 wt %, was mixed with the Fe—Si alloy powder in the range of 3.0 to 4.2 wt %, was mixed with the Fe—Si—Al alloy powder in the range of 1.0 to 2.5 wt %.

3) Mixing of Insulating Coating Powder

Each of the alloy powders coated with the insulating material with a magnetic permeability of 60 was mixed at a predetermined ratio as shown in the following Table 2. In the present invention, it is possible to manufacture a soft magnetic powder core which exhibits target levels of a DC superposition characteristic and a core loss characteristic by varying a mixing ratio according to the characteristic of the powder core.

TABLE 2

| | Alloy powder | Example 1 | Example 2 | Example 3 | Comparative Example 1 | Comparative Example 2 |
|---|---|---|---|---|---|---|
| Mixing ratio (wt %) | Fe—Ni | 70 | 70 | 70 | | |
| Mixing ratio (wt %) | Fe—Si | 0 | 20 | 10 | 100 | |
| Mixing ratio (wt %) | Fe—Si—Al | 30 | 10 | 20 | | 100 |

4) Manufacturing of powder compact and core

Each of the alloy powders were mixed according to the mixing condition, were mixed with an appropriate amount of a lubricant, and a powder compact was manufactured using a forming mold and a powder compaction press. During the powder forming, a pressurization condition ranged from 17 to 22 ton/cm$^2$. Heat treatment was performed on the manufactured powder compact so as to implement internal stress, desired magnetic permeability, and an electromagnetic characteristic and was carried out at a temperature ranging from 700° C. to 850° C. in a nitrogen or hydrogen atmosphere. In addition, after the heat treatment, corrosion resistance and strength were imparted to the powder compact through epoxy coating treatment, as necessary, and thus the powder compact was manufactured as a highly reliable product.

Experimental Example

1) Comparison of Magnetic Characteristics of Soft Magnetic Powder Cores

Magnetic characteristics of the soft magnetic powder cores for an inductor manufactured according to Examples and Comparative Examples were measured. For magnetic characteristic evaluation, a soft magnetic powder core having an outer diameter of 27.7 mm, an inner diameter of 14.1 mm, and a height of 11.9 mm was used.

Core loss measurement conditions were 50 kHz/100 kHz, 100 mT, 25° C., and a target core size of Φ27, and the measured results were shown in the following Table 3.

TABLE 3

| | | Core loss (mW/cm3) | | Measured temperature |
|---|---|---|---|---|
| | Items | 50 kHz/ 100 mT | 100 kHz/ 100 mT | Measured temperature |
| Example 3 | Fe—Si—Al—Ni based | 199 | 563 | 25° C. |
| Comparative Example 1 | Fe—Si based | 527 | 1252 | 25° C. |
| Comparative Example 2 | Fe—Si—Al based | 304 | 719 | 25° C. |

In addition, DC superposition measurement conditions were in the range of 0 to 100 Oe, 100 kHz, 25° C., and a target core size of Φ27, and the measured results were shown in the following Table 4 and FIG. 3.

TABLE 4

Unit: %

| Applied magnetic field (Oe) Applied magnetic field (Oe) | Example 3 (Fe—Si—Al—Ni based) | Comparative Example 1 (Fe—Si based) | Comparative Example 2 (Fe—Si—Al based) |
|---|---|---|---|
| 0.0 | 100.0 | 100.0 | 100.0 |
| 5.1 | 99.6 | 99.9 | 99.5 |
| 10.3 | 99.3 | 99.5 | 98.2 |
| 20.6 | 98.6 | 98.1 | 94.0 |
| 30.9 | 97.7 | 96.2 | 88.3 |
| 41.2 | 96.3 | 93.6 | 81.7 |
| 51.5 | 94.6 | 90.7 | 74.8 |
| 61.7 | 92.5 | 87.4 | 68.0 |
| 72.0 | 90.1 | 83.9 | 61.6 |
| 82.3 | 87.3 | 80.3 | 55.7 |
| 92.6 | 84.1 | 76.6 | 50.3 |
| 102.9 | 80.7 | 73.0 | 45.5 |
| 113.2 | 77.0 | 69.4 | 41.3 |
| 123.5 | 73.1 | 65.8 | 37.5 |
| 133.8 | 69.2 | 62.4 | 34.1 |
| 144.1 | 65.2 | 59.2 | 31.2 |
| 154.4 | 61.1 | 56.0 | 28.5 |

2) Reliability Test

In order to apply the soft magnetic powder core to an OBC of an electric vehicle, the alloy powder cores of Example 3 and Comparative Examples 1 and 2 were compared with respect to reliability as an inspection item. For reliability evaluation, the alloy powder cores were put into a chamber at a high temperature/high humidity [85° C./85%] and maintained for a predetermined period of time [1,000 hours], and the reliability evaluation results were evaluated as a rate of change by measuring inductance using an LCR meter before and after inputting the powder cores into the chamber. The inductance measurement results are shown in the following Table 5 below. According to these results, it was evaluated that the reliability of the powder core of Example 3 according to the present invention was satisfied within ±5% of the rate of change reference, and thus it can be confirmed that the powder core of Example 3 was suitable for electrical components.

TABLE 5

| Example 3 Inductance (μH) | | | Comparative Example 1 (Fe—Si based) Inductance (μH) | | | Comparative Example 2 (Fe—Al—Si based) Inductance (μH) | | |
|---|---|---|---|---|---|---|---|---|
| Before input | After input | Rate of change (%) | Before input | After input | Rate of change (%) | Before input | After input | Rate of change (%) |
| 48.32 | 47.48 | −1.75 | 51.49 | 50.17 | −2.18 | 48.43 | 47.46 | −2.00 |
| 48.79 | 47.88 | −1.89 | 48.43 | 47.90 | −1.09 | 50.35 | 49.32 | −2.06 |
| 50.38 | 49.39 | −1.97 | 50.03 | 49.26 | −1.54 | 50.05 | 48.99 | −2.12 |
| 47.66 | 46.89 | −1.62 | 51.18 | 49.84 | −2.62 | 48.45 | 47.50 | −1.96 |
| 51.16 | 50.13 | −2.01 | 51.86 | 50.53 | −2.56 | 48.18 | 47.25 | −1.93 |

In accordance with the present invention, an inductor core having an excellent DC superposition characteristics and a core loss characteristic can be manufactured by combining various alloy powders in different types at an optimal ratio. In particular, in a soft magnetic powder composition for an inductor core according to embodiments, costs can be reduced by significantly lowering a content of an expensive nickel-containing metal powder by as much as 20% or more so that an inductor core with excellent competitiveness in price can be provided.

In addition, a method of manufacturing a soft magnetic inductor core according to embodiments can manufacture an inductor core through a series of processes including a heat treatment process of an alloy powder, an insulation coating process, a preparing process of a powder compact, and a heat treatment process of the powder compact so that there is an advantage of simplifying the manufacturing process and lowering a defect rate.

As described above, a power conversion component of a vehicle including the soft magnetic inductor core with an excellent magnetic characteristic, excellent competitive in price, and excellent process suitability has improved performance and can contribute to the development of eco-friendly vehicles.

However, it should be noted that effects of the present invention are not limited to the above described effect, and other effects of the present invention not mentioned above can be clearly understood by those skilled in the art from the above detailed description.

What is claimed is:

1. A soft magnetic powder composition for an inductor core, comprising 60 to 80 wt % Fe—Ni alloy powder, 20 to 25 wt % Fe—Si alloy powder, and 10 to 30 wt % Fe—Si—Al alloy powder based on a total alloy powder,
   wherein each of the Fe—Ni alloy powder, the Fe—Si alloy powder, and the Fe—Si—Al alloy powder are coated with an insulating material that includes silicate.

2. The soft magnetic powder composition of claim 1, wherein, in a metal content of the soft magnetic powder composition, Fe ranges from 54.2 to 68.8 wt %, Ni ranges from 30.0 to 40.0 wt %, Si ranges from 0.9 to 4.1 wt %, and Al ranges from 0.3 to 1.7 wt % based on the total alloy powder.

3. The soft magnetic powder composition of claim 1, wherein:
   a Ni content of the Fe—Ni alloy powder is in the range of 40 to 50 wt %;
   a Si content of the Fe—Si alloy powder is in the range of 3 to 6 wt %;
   a Si content of the Fe—Si—Al alloy powder is in the range of 8 to 11 wt %; and
   an Al content is in the range of 4 to 7 wt %.

4. The soft magnetic powder composition of claim 1, wherein an average particle size of the Fe—Ni alloy powder is in the range of 17 μm to 23 μm,
   an average particle size of the Fe—Si alloy powder is in the range of 23 μm to 29 μm, and
   an average particle size of the Fe—Si—Al alloy powder is in the range of 20 μm to 28 μm.

5. The soft magnetic powder composition of claim 1, wherein the insulating material further includes one or more selected from the group consisting of glass frit, alumina, and water glass.

6. The soft magnetic powder composition of claim 1, wherein, in each alloy powder coated with the insulating material, a content of the insulating material of the Fe—Ni alloy powder is in the range of 1.5 to 3.0 wt %,
   a content of the insulating material of the Fe—Si alloy powder is in the range of 3.0 to 4.2 wt %, and
   a content of the insulating material of the Fe—Si—Al alloy powder is in the range of 1.0 to 2.5 wt %.

7. The soft magnetic powder composition of claim 1, wherein a permeability of the alloy powder coated with the insulating material is in the range of 50 to 125.

8. The soft magnetic powder composition of claim 7, wherein a permeability of the alloy powder coated with the insulating material is in the range of 50 to 70.

* * * * *